United States Patent [19]

Flenniken

[11] Patent Number: 5,889,117
[45] Date of Patent: Mar. 30, 1999

[54] POLYMERIC COMPOSITIONS FOR POWER CABLES

[75] Inventor: Cindy L. Flenniken, Indianapolis, Ind.

[73] Assignee: BICC Cables Corporation, Indianapolis, Ind.

[21] Appl. No.: 708,713

[22] Filed: Sep. 5, 1996

Related U.S. Application Data

[63] Continuation-in-part of Ser. No. 406,703, Mar. 20, 1995, abandoned.

[51] Int. Cl.⁶ .............................. C08L 33/04; C08L 33/06; C08L 35/02
[52] U.S. Cl. ........................... 525/222; 525/227; 525/228
[58] Field of Search ..................................... 525/222, 227, 525/228

[56] References Cited

U.S. PATENT DOCUMENTS

| | | | |
|---|---|---|---|
| 4,305,849 | 12/1981 | Kawasaki et al. | 252/567 |
| 4,503,102 | 3/1985 | Mollison | 428/35 |
| 4,612,139 | 9/1986 | Kawasaki et al. | 252/511 |
| 4,760,116 | 7/1988 | Roberts | 525/221 |
| 4,812,505 | 3/1989 | Topcik | 524/377 |
| 4,851,463 | 7/1989 | Opsahl et al. | 524/109 |
| 4,997,713 | 3/1991 | Koehnlein et al. | 428/379 |
| 5,278,272 | 1/1994 | Lai et al. | 526/348.5 |
| 5,679,465 | 10/1997 | Bekele | 428/474.4 |

OTHER PUBLICATIONS

K. Tominari, "Special Applications and Markets For Ethylene Alpha–Olefin Copolymerns in Japan", Mitsui Petrochemical Industries, Ltd., Specialty Plastics Conference '86, Nov. 13, 14, 15, 1986.

*Primary Examiner*—P. Hampton-Hightower
*Attorney, Agent, or Firm*—Oliff & Berridge, PLC

[57] ABSTRACT

A semi-conductive or insulating composition includes an ethylene/octene copolymer and at least one additional polymer, such as ethylene/vinyl acetate. The composition may also include carbon black and other additives. The composition may be used as a semi-conductive or insulating layer in such applications as electrical cables.

8 Claims, 1 Drawing Sheet

POLYMERIC COMPOSITIONS FOR POWER CABLES

This application is a continuation-in-part application of my U.S. patent application Ser. No. 08/406,703, filed Mar. 20, 1995 now abandoned. This application discloses and claims an invention disclosed but not claimed in my application; however, additional descriptive matter is included in the present specification to elaborate upon the present invention.

BACKGROUND OF THE INVENTION

This invention relates to polymer compositions, particularly ethylene/octene copolymer-containing compositions, suitable for use as semi-conductive and insulating compositions such as in electrical cables. More particularly, the present invention relates to semi-conductive and insulating compositions including an ethylene/octene copolymer and another polymer, such as an ethylene/vinyl acetate copolymer. The polymeric composition may also contain such additives as carbon black, antioxidants and curatives, depending on the final use of the polymeric composition.

Ethylene/vinyl acetate is known as a useful polymer in formulating polymeric compositions, particularly for use in electrical conductors such as power cables and wire. For example, U.S. Pat. No. 4,612,139 to Kawasaki et al. discloses semi-conducting compositions containing between 59 and 84% by weight of an ethylene/vinyl acetate copolymer. The balance of the compositions disclosed therein includes carbon black, antioxidants and curatives. Similarly, U.S. Pat. No. 4,305,849 also to Kawasaki et al. discloses insulating compositions containing either polyethylene or ethylene/vinyl acetate as the polymer component. The compositions further include polyethylene glycol, antioxidants and curatives.

The use of other polyolefin polymers to form polymer compositions is also known. For example, U.S. Pat. No. 4,812,505 to Topcik discloses heat and water tree resistant compositions containing copolymers of ethylene and an $\alpha$-olefin. Examples of the polymers are polyethylene, ethylene/1-butene, ethylene/propylene/1,4-hexadiene, ethylene/propylene/ethylidene and ethylene/propylene.

However, none of the references discloses the incorporation of an ethylene/octene copolymer and a second polymer into a polymeric formulation, or the specific combination of both an ethylene/vinyl acetate copolymer and an ethylene/octene copolymer into an insulating or semi-conductive polymeric composition.

Other patent references disclose the use of octene monomers, such as 1-octene, in polymer compositions. For example, U.S. Pat. No. 5,278,272 discloses substantially linear polymers incorporating ethylenically unsaturated monomers such as 1-octene into the polymer compositions. U.S. Pat. No. 4,997,713 discloses polymeric formulations for electrical cables, wherein the polymeric formulation comprises (1) an ethylene/$\alpha$-olefin copolymer and (2) an ethylene homopolymer, an ethylene/alkyl acrylate copolymer, an ethylene/alkyl acrylate/acrylic acid terpolymer, or a mixture thereof.

U.S. Pat. No. 4,851,463 also discloses the possible inclusion of ethylene/1-octene into a fire retardant polymeric composition, wherein the fire retardant polymeric composition includes an ethylene copolymer, a $C_2$–$C_6$ $\alpha$-olefin polymer, and other additives. However, the patent does not disclose a polymeric composition specifically comprising an ethylene/octene copolymer.

SUMMARY OF THE INVENTION

The need continues to exist for improved compositions for the production of such articles as electrical wire and cable. Specifically, the need continues to exist for materials with improved performance characteristics. It has been discovered that polymer compositions, including a mixture of an ethylene/octene copolymer with another polyolefin polymer such as an ethylene/vinyl acetate copolymer, may be used to produce semi-conductive or insulating polymer compositions, having such improved performance characteristics. Such improved polymer compositions are provided herein.

Specifically, this invention provides polymer compositions, such as a semi-conductive composition comprising an ethylene/octene copolymer, at least one additional polymer, and carbon black. Additionally, the present invention provides insulating compositions comprising an ethylene/octene copolymer and at least one additional polymer.

Polymer compositions of the present invention may, for example, be used as semi-conductive layers bonded to primary insulation layers or electrical conductors, such as in electrical cables. For example, the polymer compositions may be used as insulation shield materials in the form of semi-conductive layers that may be easily stripped or removed from the insulation materials. The polymer compositions may also be used in strand filling compounds, either conductive or nonconductive, or in conductive or nonconductive cable jacketing formulations. Furthermore, polymer compositions not possessing semi-conductive properties may be used as insulation materials.

DETAILED DESCRIPTION OF PREFERRED EMBODIMENTS

Figure 1:
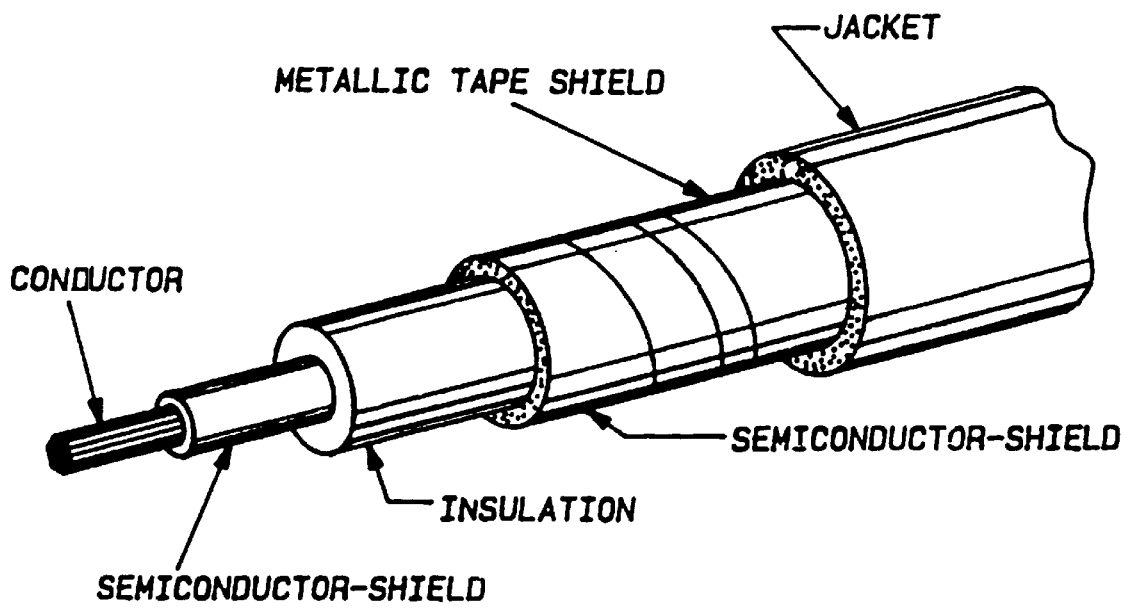
FIG. 1 is an illustration of a typical power cable.

The improved polymer compositions of the present invention are made by compounding at least one polymer compound, such as a polyolefin homopolymer, copolymer or terpolymer, with an ethylene/octene copolymer. Other additives may be incorporated into the polymer composition, according to the desired use of the composition. In preferred embodiments of the present invention, the at least one polymer compound is an ethylene/vinyl acetate copolymer.

The semi-conductive compositions of the present invention may be made by combining an ethylene/octene copolymer with another polymer, such as a polyolefin such as ethylene/vinyl acetate, and an amount of carbon black sufficient to render the compositions semi-conductive. Alternatively, it is possible to incorporate a minor amount of carbon black into the polymer composition to form an insulating material. Here, the amount of carbon black should be much less than that sufficient to impart semi-conductive properties to the polymer composition. In yet further embodiments of the present invention, the carbon black may be omitted from the formulations entirely, thereby providing polymeric compositions having insulating properties.

In preparing the polymer compositions of the present invention, the non-ethylene/octene polymer may be selected from any of the various homopolymers, copolymers and terpolymers known in the art, the selection being based upon the ultimate desired use of the polymer composition. For example, the polymers used in the polymeric compositions of the present invention may include, but are not limited to, homopolymers, copolymers and graft polymers of ethylene where the co-monomers are selected from butene, hexene, propene, vinyl acetate, acrylic acid, methacrylic acid, esters of acrylic acid, esters of methacrylic acid, maleic anhydride, half esters of maleic anhydride, carbon monoxide and the like; elastomers selected from natural rubber, polybutadiene, polyisoprene, random styrene butadiene rubber, polychloroprene, nitrile rubbers, ethylene propylene copolymers and terpolymers and the like; homopolymers and copolymers of styrene, including styrene-butadiene, styrene-butadiene-styrene linear and radial polymers, acrylonitrile-butadiene-styrene, styrene acrylonitrile and the like; linear and branched polyether or polyester polyols; crystalline and amorphous polyesters and polyamides; alkyd resins, rosin acids or rosin esters; hydrocarbon resins produced from thermal or Friedal Crafts polymerization of cyclic diene monomers such as dicyclopentadiene, indene, cumene and the like; ethylene/silane copolymers; ethylene/α-olefin/diene terpolymers such as ethylene/propylene/1,4-hexadiene, ethylene/1-butene/1,4-hexadiene and the like; mixtures thereof and the like. Additionally, the polymer used in compositions of the present invention may include copolymers and terpolymers containing the above-identified polymers as major components of the copolymer or terpolymer.

Preferably, the polymer used in the compositions of the present invention is selected from the group consisting of ethylene/vinyl acetate, ethylene/butene such as ethylene/1-butene, ethylene ethyl acrylate, ethylene acrylic acid, equivalents thereto, mixtures thereof and the like.

The precise monomer content of the polymers used in the present invention will depend upon such factors as economic considerations and the desired applications of the resultant composition. In the case of using a polyolefin in forming the polymeric composition, typically the polymers used in compositions of the present invention will generally comprise in the range of from about 25 mole percent to about 98 mole percent ethylene, based on the total moles of monomer. Preferably, the polyolefin polymers comprise from about 30 mole percent to about 95 mole percent, and more preferably from about 35 mole percent to about 90 mole percent, ethylene. The other monomers, in the case of polyolefin copolymers, will comprise the balance of the polymer.

However, the ethylene content in the polymers may vary depending on the comonomer(s) present in the polymer. For example, in the case of an ethylene/vinyl acetate copolymer, it is preferred that the polymer comprise from about 15 mole percent to about 80 mole percent vinyl acetate. Preferably, the ethylene/vinyl acetate copolymer is of the rubbery variety, and accordingly has a vinyl acetate content of above about 28 mole percent. Even more preferably, the ethylene/vinyl acetate copolymer comprises from about 40 mole percent to about 60 mole percent vinyl acetate.

Additionally, the polymer used in the polymeric formulations of the present invention may be either crosslinked or non-crosslinked. If the polymer is to be crosslinked, any of a wide variety of known crosslinking agents may be added to the formulation.

The polymeric compositions of the present invention also contain an ethylene/octene copolymer. Preferably, the ethylene/octene copolymer is an ethylene/1-octene copolymer. This ethylene/octene copolymer is incorporated in addition to the polymer described above. Therefore, while ethylene/octene falls within the scope of the above-described polymer, it should be different from the ethylene/octene copolymer forming the second copolymer component. That is, for example, the polymers included in the polymeric formulations of the present invention may include copolymers of two different octene monomer units, such as 1-octene and 1,3-octadiene.

In embodiments of the present invention, the polymeric compositions may include an additive polymer such as, for example, acrylonitrile butadiene elastomer. Such a polymer may be incorporated either as the at least one additional polymer compound, or as a third constituent polymer in the polymeric formulation. In preferred embodiments, where acrylonitrile butadiene elastomer is used, the copolymer preferably has an acrylonitrile content from about 25% to about 55% by weight.

In a particularly preferred embodiment of the present invention, the polymeric composition comprises an ethylene/vinyl acetate copolymer and an ethylene/octene copolymer. In this embodiment, the ethylene/vinyl acetate copolymer preferably has a vinyl acetate content of between about 40 mole percent and about 60 mole percent, more preferably about 50 mole percent, and has a melt index of between about 7 and about 11. The ethylene/octene preferably has an octene content of between about 5 mole percent and about 35 mole percent, more preferably about 24 mole percent, has a melt index of between about 25 and about 40, more preferably about 31, and has a density of between about 0.80 g/cm$^3$ and about 0.95 g/cm$^3$, more preferably about 0.87 g/cm$^3$. In this embodiment, the polymer composition preferably contains from about 70 to about 90 parts by weight ethylene/vinyl acetate and from about 10 to about 30 parts by weight ethylene/octene polymer per 100 parts by weight of the polymer material in the polymeric composition. More preferably, the polymeric composition comprises about 81.3 parts by weight ethylene/vinyl acetate and about 18.7 parts by weight ethylene/octene polymer per 100 parts by weight of the polymer material in the polymeric composition. The polymeric composition may, of course, contain other additives such as carbon black, antioxidant, curatives, and the like.

In the present invention, carbon black may be added to the polymer compositions, for example as a colorant or to impart semi-conductive properties to the composition. The carbon black added to the polymer may be any of the various available carbon blacks. Thus any of a wide variety of carbon blacks may be used in the present invention, including finely divided carbon such as lamp black, furnace black, and the like. Preferably, to avoid problems associated with carbon black dust, the carbon black is pelletized, although non-pelletized carbon black, such as in its fluffy form, may also be used with equal success.

When carbon black is added to the polymer composition, the carbon black is generally present in the composition in the amount of from about 0.1% to about 65% by weight of the polymer composition. Preferably the carbon black is present in an amount of from about 10% to about 50% by weight, based on the weight of the total composition. Such compositions generally possess semi-conductive properties. The content of the carbon black may be adjusted, of course, according to the desired use of the final composition and the desired relative conductivity of the composition. For example, carbon black may be incorporated into a polymer composition in smaller amounts to provide colored insulating materials or to improve the ultra-violet resistance of the compounds. The carbon black may also be entirely omitted from the polymer composition, for example to provide insulating materials.

In addition to the usual additives that may be added to the polymeric compositions of the present invention, polyethylene glycol and derivatives thereof, such as polyethylene glycol ethers and esters, may be added. Such additives may further enhance the performance characteristics of the polymeric compositions. In the process and compositions of the present invention, the polyethylene glycol compound may be added directly into the polymeric composition, or may be added in the form of a pelletizing aid on carbon black pellets.

For example, a typical formulation of a polymeric composition for use in semi-conductive wire and cable applications of the present invention preferably comprises:

(1) 25–55% by weight of a carbon black;
(2) 0–2% by weight of a stabilizer or antioxidant;
(3) 0–5% by weight of an organic peroxide, such as dicumyl peroxide;
(4) 0–10% by weight of a vinyl silane; and
(5) the remainder being a blend of polymers including ethylene/octene and at least one additional polymer, as described above.

The compositions of the present invention may also include suitable additives for their known purposes and in known and effective amounts. For example, the polymeric compositions of the present invention may also include such additives as crosslinking agents, vulcanizing agents, stabilizers, pigments, dyes, colorants, metal deactivators, oil extenders, lubricants, inorganic fillers and the like.

For example, the polymer compositions of the present invention may include at least one crosslinking agent, preferably in an amount of from about 0.5 to about 5% by weight, based on the weight of the specific polymer being used. An organic peroxide is preferably used as a free radical generator and crosslinking agent. Useful organic peroxide crosslinking agents include, but are not limited to, $\alpha, \alpha'$-bis (tert-butylperoxy) -diisopropylbenzene, dicumyl peroxide, di(tert-butyl) peroxide, and 2,5-dimethyl-2,5-di(tert-butylperoxy)-hexane. Various other known coagents and crosslinking agents may also be used. For example, organic peroxide crosslinking agents are disclosed in U.S. Pat. No. 3,296,189, the entire disclosure of which is incorporated herein by reference.

As examples of antioxidants and processing aids that may be incorporated in the polymer compositions of the present invention, may be mentioned, for example, polymerized 1,2-dihydro-2,2,4-trimethylquinoline, octadecyl 3,5-ditert-butyl-4-hydroxyhydrocinnamate, 4,4'-thio-bis-(3-methyl-6-tert-butylphenol), thio-diethylene-'bis-(3,5-ditert-butyl-4-hydroxy) hydrocinnamate, distearyl-thio-diproprionate, mixtures thereof and the like. Such antioxidants may be present in compositions of the present invention in an amount of preferably from about 0.4 to about 2.0% by weight, and more preferably from about 0.4 to about 0.75% by weight. Other suitable conventional antioxidants that may be used in compositions of the present invention include sterically hindered phenols, phosphites and selected amines.

Additionally, processing aids may be added to the polymeric formulations for their known purposes. Thus, although processing aids are not necessary to achieve homogeneous blends and reduced viscosity, they may be added into the compositions of the present invention to further enhance these properties. For example, the processing aids may include, but are not limited to, metal stearates such as zinc stearate and aluminum stearate, stearate salts, stearic acid, polysiloxanes, stearamide, ethylene-bisoleyamide, ethylene-bisstearamide, mixtures thereof and the like. Processing aids, when incorporated into compositions of the present invention, are generally used in amounts of from about 0.1 to about 5.0 percent by weight, based on the total weight of the polymer composition.

The polymer compositions of the present invention may be manufactured using conventional machinery and methods to produce the final polymer product. The compositions may be prepared by batch or continuous mixing processes such as those well known in the art. For example, equipment such as Banbury mixers, Buss cokneaders, and twin screw extruders may be used to mix the ingredients of the formulation. For instance, the components of the polymer compositions of the present invention may be mixed and formed into pellets for future use in manufacturing such materials as insulated electrical conductors.

The polymer compositions of the present invention may be incorporated into any product where the properties of the polymer composition are suitable. For example, the polymer compositions are particularly useful for making insulated electrical conductors, such as electrical wires and power cables. Depending on the conductivity of the polymer composition, the polymer composition may be used, for example, as a semi-conductive material or as an insulating material in such wires and cables. More preferably, a semi-conductive shield of the polymer composition may be formed directly over an inner electrical conductor as a conductor shield, or over an insulating material as a bonded or strippable insulation shield or as an outer jacketing material. The polymer compositions of the present invention may also be used in strandfilling applications in either conductive or nonconductive formulations.

For ease of illustration, FIG. 1 depicts the typical components of an electrical cable. FIG. 1 shows a typical power cable comprising a conductive core (such as a multiplicity of conductive wires), surrounded by several protective layers. Additionally, the conductive core may contain a water blocking compound with the conductive wires. The protective layers include a jacket layer, insulating layer, and semi-conductive shields.

In the present invention, it has been found that the incorporation of ethylene/octene copolymer into the polymeric formulations provides unexpectedly improved performance and processing characteristics to the formulations. For example, the ethylene/octene component lowers the viscosity of the polymeric formulation during processing because the ethylene/octene starts to melt and provides lubricating effects earlier than the other polymer components, such as in the case of ethylene/vinyl acetate. This effect is especially important in the case of formulations containing ethylene/vinyl acetate where the vinyl acetate content of the ethylene/vinyl acetate copolymer is higher than 40% by weight. In such instances, the resins tend to become very sticky, thus increasing the viscosity of the formulation and hindering processing performance. It is therefore necessary to reduce the viscosity and ensure the miscibility of the various components.

Surprisingly, the polymeric formulations of the present invention have a lower viscosity than similar polymeric formulations that do not include ethylene/octene copolymer. A primary advantage of such decreased viscosity is that processing is improved because the extruder is not unduly stressed. Furthermore, less lubricants are needed in the processing machinery for polymeric compositions of the present invention, which means that less lubricant is undesirably introduced into the polymeric compositions themselves.

A further advantage of the polymeric formulations in embodiments of the present invention is that they blend well and exhibit lower adhesion to crosslinked polyethylene, thus providing increased and continued strippability of the resultant products. This decreased adhesion is preferable, for example, because it increases the strippability of the polymeric composition from other compositions to which it is adhered. For example, decreased adhesion in the case of electrical cable allows for easier strippability of the semi-conductive shield from an underlying insulating material, with concurrently decreased pick-off, i.e., decreased amounts of polymer material residue left on underlying layers. In contrast, a lower strippability and higher adhesion is typically associated with a higher pickability, indicating that the composition tends to stick to other compositions to which it is adhered and flakes off rather than stripping off.

Furthermore, it has been found that polymeric compositions according to embodiments of the present invention possess surprising and unexpected properties over polymeric compositions not containing an ethylene/octene copolymer. For example, the compositions of the present invention provide a smoother surface in products incorporating the polymeric composition. Additionally, the polymeric formulations of the present invention exhibit decreased "bloom," indicating that additives in the polymeric composition do not bloom to the surface of the composition over time during use of the composition. Moreover, the additives incorporated in the polymeric compositions are better dispersed in the polymer. Such improved dispersion is especially important in the case of semi-conductive formulations, where the carbon black or other additives must be more uniformly dispersed.

Based on the instant disclosure, one skilled in the art will recognize that the various components of the polymer compositions discussed above may be selected and adjusted as necessary to achieve specific end products with desirable performance characteristics. The invention will now be described in more detail with reference to specific preferred embodiments thereof, it being understood that these examples are intended to be illustrative only, and the invention is not intended to be limited to the materials, conditions, process parameters, etc. recited herein. All parts and percentages are by weight unless otherwise indicated.

EXAMPLES

Example 1

A semi-conductive shield for use in preparing electrical cables is prepared. The formulation includes 36.38% by weight of carbon black, 48.88% by weight of an ethylene/vinyl acetate copolymer (50% vinyl acetate), 11.24% by weight of an ethylene/octene copolymer and 3.5% by weight of usual additives. The ethylene/vinyl acetate copolymer has a melt index of between 7 and 11. The ethylene/octene copolymer has a melt index of 31 and a density of 0.87 g/cm$^3$. The additives include about 0.9% of a stearic acid processing aid, 0.7% of an antioxidant 1,2-dihydro-2,2,4-trimethylquinoline, 1.0% of an organic peroxide curative α,α'-bis(tert-butylperoxy)diisopropylbenzene and 0.9% hydrotalcite. The carbon black is a pelletized carbon black prepared with deionized water. The components are mixed in a Banbury mixer or other suitable equipment.

The formulation is tested for various physical and electrical characteristics. Cure data is determined by measuring the torque (lb-in.) on plaques of the formulation with an Oscillating Disc Rheometer (ODR) operating at 400° F. and 30° arc. The low ($M_l$) and high ($M_h$) ODR torque values, scorch time ($t_s2$) and 50% ($t_c(50)$) and 90% ($t_c(90)$) cure times are presented in Table 1 below. The formulation is also evaluated for volume resistivity at various temperatures, tensile strength and elongation, extrusion parameters on a Haake Rheocord and adhesion to crosslinked polyethylene. The results are presented in Table 1 below.

Example 2

A semi-conductive formulation is prepared as in Example 1, except that the formulation is adjusted to further include the incorporation of polyethylene glycol as an additive material. The formulation is as follows:

| Component | % by weight |
| --- | --- |
| Carbon black | 36.38 |
| Ethylene/vinyl acetate | 48.22 |
| Ethylene/octene | 11.08 |
| Polyethylene glycol | 0.82 |
| Antioxidant | 0.70 |
| Stearic acid | 0.90 |
| Hydrotalcite | 0.90 |
| Peroxide curative | 1.00 |
| Total | 100.00 |

In this Example, the carbon black is a pelletized carbon black prepared with deionized water, as in Example 1. The polymers and additives are also the same as those used in Example 1. The polyethylene glycol has a weight average molecular weight of 20,000. The components of this Example 2 are mixed as in Example 1 in a Banbury mixer. The same tests and measurements are conducted as in Example 1, and the results are presented in Table 1.

Example 3

Polyethylene glycol-treated carbon black pellets are formed wherein the polyethylene glycol is used as a pelletizing aid in producing the carbon black pellets from carbon black in its fluffy form. The treated carbon is prepared by using 2.0 parts by weight polyethylene glycol (weight average molecular weight=20,000) per 100 parts by weight of carbon black.

A semi-conductive shield for use in preparing electrical cables is prepared by combining 48.22 parts by weight of an ethylene/vinyl acetate copolymer (5% vinyl acetate content), 11.08 parts by weight of an ethylene/octene copolymer, 37.20 parts by weight of the treated carbon black, and 3.5 parts by weight of other additives. The ethylene/vinyl acetate copolymer has a melt index of between 7 and 11. The ethylene/octene copolymer has a melt index of 31 and a density of 0.87 g/cm$^3$. The additives include 0.9% of a stearic acid processing aid, 0.7% of an antioxidant 1,2-dihydro-2,2,4-trimethylquinoline, 1.0% of an organic peroxide curative α,α'-bis(tert-butylperoxy)-diisopropylbenzene and 0.9% hydrotalcite. The components are mixed in a Banbury mixer as in Example 1.

The same tests and measurements are conducted as in Example 1, and the results are presented in Table 1.

TABLE 1

| Property | Example | | |
| --- | --- | --- | --- |
|  | 1 | 2 | 3 |
| ODR Measurements at 400° F.: | | | |
| $M_l$, lb-in. | 6.8 | 6.3 | 6.3 |
| $M_h$, lb-in. | 47.1 | 46.6 | 49.7 |

TABLE 1-continued

| Property | Example 1 | Example 2 | Example 3 |
|---|---|---|---|
| $t_s2$, sec. | 51 | 43.3 | 49 |
| $t_c(50)$, sec. | 98.7 | 83.6 | 97.7 |
| $t_c(90)$, sec. | 150.7 | 125 | 140.7 |
| Adhesion to Crosslinked Polyethylene, lb/½ in: | | | |
| Room Temperature | 4.51 | 5.56 | 3.89 |
| Volume Resistivity, ohm-cm: | | | |
| Room Temperature | 811 | 611 | 305 |
| 50° C. | 961 | 454 | 359 |
| 90° C. | 721 | 492 | 271 |
| 110° C. | 653 | 399 | 240 |
| 130° C. | 556 | 376 | 201 |
| Extrusion Parameters: | | | |
| 20 RPM Head Pressure, psi | 1928 | 1762 | 1718 |
| 20 RPM HP/Output, psi/g/min. | 156.3 | 145.9 | 115.8 |
| 30 RPM Head Pressure, psi | 2290 | 2197 | 2138 |
| 30 RPM HP/Output, psi/g/min. | 119.1 | 109.8 | 90.1 |
| 40 RPM Head Pressure, psi | 2723 | 2476 | 2404 |
| 40 RPM HP/Output, psi/g/min. | 99.3 | 88.4 | 80.7 |
| Tensile Strength and Elongation: Initial Conditions: | | | |
| Average Tensile Strength, psi | 2138 | 2099 | 2134 |
| Average Elongation, % | 254 | 263 | 245 |
| Average 100% Modulus | 1254 | 1069 | 1177 |
| Average 200% Modulus | 1997 | 1867 | 1964 |
| After aging at 121° C. for 168 hrs (7 days): | | | |
| Average Tensile Strength, psi | 2028 | 2066 | 2072 |
| Average Elongation, % | 228 | 284 | 248 |
| Tensile Retention, % | 95 | 98 | 97 |
| Elongation Retention, % | 90 | 108 | 101 |

The foregoing embodiments are intended to illustrate and not limit the present invention. It will be apparent that various modifications can be made without departing from the spirit and scope of the invention as defined by the appended claims.

What is claimed is:

1. A composition suitable for use in electrical cables, said composition comprising an ethylene/octene copolymer and at least one additional polymer, wherein said at least one additional polymer comprises an ethylene/vinyl acetate copolymer and said composition comprises from about 70 to about 90 parts by weight of said ethylene/vinyl acetate copolymer and from about 10 to about 30 parts by weight of said ethylene/octene copolymer.

2. A composition according to claim 1, wherein said ethylene/vinyl acetate copolymer contains from about 28 to about 80 mole percent vinyl acetate.

3. A composition according to claim 1, wherein said composition comprises about 81 parts by weight of said ethylene/vinyl acetate copolymer and about 19 parts by weight of said ethylene/octene copolymer.

4. A composition according to claim 1, further comprising at least one additive selected from the group consisting of crosslinking agents, vulcanizing agents, stabilizers, antioxidants, processing aids, pigments, dyes, colorants, metal deactivators, oil extenders, lubricants, and inorganic fillers.

5. A composition according to claim 1, wherein said ethylene/octene copolymer is an ethylene/1-octene copolymer.

6. A composition according to claim 2, wherein said at least one additional polymer comprises an ethylene/butene copolymer.

7. A composition according to claim 1, wherein said ethylene/octene copolymer has an octene content of from about 5 to about 35 mole percent.

8. A composition according to claim 1, wherein said ethylene/vinyl acetate copolymer has a vinyl acetate content of from about 40 to about 60 mole percent.

* * * * *